United States Patent [19]

Ratzlaff

[11] 3,772,819

[45] Nov. 20, 1973

[54] CARRYING CASE FOR FISHING RODS AND REELS

[76] Inventor: Waldo O. Ratzlaff, 10705 Sunnymeade Pl., Oklahoma City, Okla. 73120

[22] Filed: Oct. 12, 1972

[21] Appl. No.: 299,830

[52] U.S. Cl. .................................................. 43/26
[51] Int. Cl. .......................................... A01k 97/08
[58] Field of Search ............................ 43/26, 25, 2; 206/16; 229/14; 220/60

[56] References Cited
UNITED STATES PATENTS

| | | | |
|---|---|---|---|
| 2,501,270 | 3/1950 | Fleming | 206/16 |
| 357,206 | 2/1887 | Kamp | 229/14 |
| 2,962,187 | 11/1960 | Morris | 220/60 |
| 3,678,611 | 7/1972 | Filgs | 43/26 |

Primary Examiner—Louis G. Mancene
Assistant Examiner—Gregory E. McNeill
Attorney—Jerry J. Dunlap et al.

[57] ABSTRACT

A case suitable for carrying a plurality of fishing rods and reels which includes an elongated tubular body comprising a first tubular member and a second tubular member secured to the first tubular member in axial alignment therewith. A wall is formed within the tubular body at the point of connection between the first and second tubular members thereby forming separated storage compartments within the tubular body. Removable cap means are disclosed on the opposite end portions of the tubular body for opening and closing the respective first and second compartments. A handle is provided for lifting the carrying case. Cushion means are positioned within the carrying case for protecting the fishing rods and reels carried therein. In a preferred embodiment the diameter of the second tubular member is substantially greater than the diameter of the first tubular member so that the second tubular member is of sufficient size to receive a fishing reel therein.

6 Claims, 5 Drawing Figures

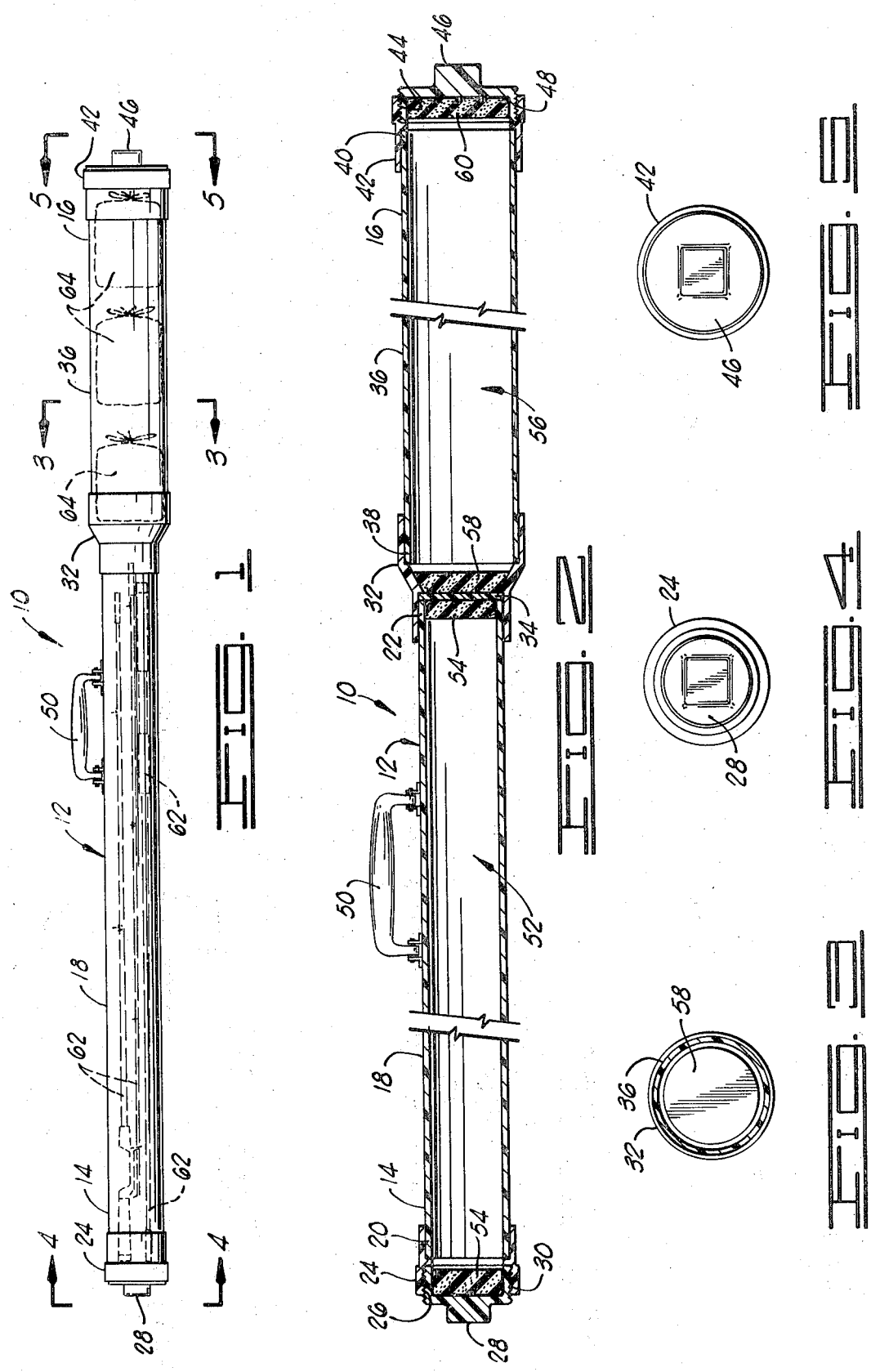

CARRYING CASE FOR FISHING RODS AND REELS

BACKGROUND OF THE INVENTION

1. Field of the Invention

This invention relates generally to improvements in fishing rod cases, and more particularly, but not by way of limitation, to an improved carrying case suitable for carrying a plurality of fishing rods and a plurality of fishing reels separated from the fishing rods.

2. Description of the Prior Art

The prior art contains a number of teachings of carrying cases for fishing rods which are suitable for carrying one or more fishing rods therein. The most common of these carrying cases are simply tubular cases closed at one end with a removable cap securable to the other end. Such cases do not, however, provide any facility for carrying fishing reels therein when the reels are removed from the fishing rods.

Another form of prior art fishing rod case comprises a substantially cylindrical tube closed at one end and open at the other end. Such cases are designed to receive the fishing rod therein with the handle of the fishing rod extending outwardly from the open end of the case with the fishing reel either in place on the handle or removed therefrom. Such cases, however, afford no protection to the fishing rod handle or the fishing reel attached thereto.

Other forms of fishing rod cases are sized and shaped such that they can receive one fishing rod therein with the fishing reel secured thereto and fully enclose the fishing rod and reel to provide adequate protection therefor. Such carrying cases are not suitable, however, for carrying more than one fishing rod and reel.

Another form of portable fishing case includes a cylindrical tube, having a removable cap on one end thereof for carrying a fishing rod therein. This particular case also includes a separate rectangularly or otherwise shaped storage container external to and suspended beneath the tubular portion for carrying fishing reels or other fishing accessories therein. Fishing cases of this latter type, however, are quite bulky and expensive to manufacture.

SUMMARY OF THE INVENTION

The present invention contemplates a novel carrying case for carrying fishing rods and reels comprising an elongated tubular body having a first end portion and a second end portion and having a passageway extending therethrough along the longitudinal axis thereof and intersecting the first and second end portions thereof. The carrying case includes wall means disposed within the passageway in the tubular body for dividing the tubular body into a first compartment adjacent to the first end portion and a second compartment adjacent to the second end portion. Also included are first closure means removably securable to the first end portion of the tubular body for alternately opening and closing the first container, and second closure means removably securable to the second end potion of the tubular body for alternately opening and closing the second container. The carrying case further includes handle means secured to the tubular body for lifting the carrying case.

An object of the present invention is to provide a carrying case for carrying fishing rods and reels and protecting them from damage when being transported or stored.

Another object of the present invention is to provide a carrying case for carrying fishing rods and reels which is light in weight and provides adequate strength to protect its contents.

Still another object of the present invention is to provide an improved carrying case for carrying fishing rods and reels which is suitable for carrying a plurality of fishing rods and a plurality of fishing reels in respective separate compartments.

A further object of the present invention is to provide an improved carrying case for carrying fishing rods and reels which is economical to construct, and convenient to use.

Further objects and advantages of the present invention will be evident from the following detailed description when read in conjunction with the accompanying drawing.

BRIEF DESCRIPTION OF THE DRAWING

FIG. 1 is a side elevation view of the carrying case of the present invention. FIG. 2 is a longitudinal cross-sectional view of the carrying case of the present invention. FIG. 3 is a cross-sectional view of the carrying case of the present invention taken along line 3—3 of FIG. 1. FIG. 4 is an elevation view of the carrying case of the present invention taken along line 4—4 of FIG. 1. FIG. 5 is an elevation view of the carrying case of the present invention taken along line 5—5 of FIG. 1.

DESCRIPTION OF THE PREFERRED EMBODIMENT

Referring now to the drawing, the carrying case of the present invention will be generally designated by the reference character 10. The case 10 includes an enlongated tubular body 12 having a first end portion 14 and a second end portion 16.

The tubular body 12 includes a substantially cylindrical first tubular member 18 having a first end portion 20 and a second end portion 22. The first tubular member 18 is preferably formed of a synthetic resin material such as ABS resin. The tubular member 18 preferably has a nominal inside diameter of three inches.

A substantially cylindrical collar 24, having internal threads 26 formed therein, is fixedly secured to the first end portion 20 of the tubular member 18. The cylindrical collar 24 is preferably formed of synthetic resin material such as ABS resin and may be suitably secured to the first tubular member 18 by means of ABS solvent cement.

A removable plug 28, having external threads 30 formed thereon, is threadedly secured to the cylindrical collar 24 by means of the threaded engagement of the threads 30 and 26.

A substantially cylindrical coupling member 32 formed of suitable synthetic resin material such as ABS resin is fixedly secured to the second end portion 22 of the first tubular member 18 by suitable means such as ABS solvent cememnt. A circular flat wall or partition 34 is fixedly secured to the second end portion 22 of the first tubular member 18 and lies in a plane substantially normal to the longitudinal axis of the first tubular member 18. The wall 34 may be suitably constructed of ABS resin and secured in place by suitable means such as ABS solvent cement.

The tubular body 12 also includes a second tubular member 36 which is substantially cylindrical in shape. The second tubular member 36 includes a first end portion 38 and a second end portion 40. The second tubular member 36 is preferably formed of a synthetic resin material such as ABS resin and is fixedly secured at the first end portion 38 thereof to the coupling member 32 by suitable means such as ABS solvent cement. It will be noted that the longitudinal axis of the second tubular member 36 is substantially coaxial with the longitudinal axis of the first tubular member 18. The second tubular member 36 preferably has a nominal inside of 4 inches.

A substantially cylindrical collar 42, having internal threads 44 formed therein, is fixedly secured to the second end portion 40 of the second tubular member 36. The cylindrical collar 42 is preferably formed of a synthetic resin material such as ABS resin and may be suitably secured to the second tubular member 36 by means of ABS solvent cement.

A removable plug 46 having external threads 48 formed thereon is removably secured to the cylindrical collar 42 by means of the threaded engagement of the threads 48 and 44 to close the second end portion 16 of the tubular body 12. The removable plug 46 is preferably formed of a synthetic resin material such as ABS resin.

A suitable handle 50 is secured to the tubular body 12 and is preferably positioned as nearly as possible to the center of gravity of the carrying case 10 to provide optimum balance. The handle 50 provides suitable convenient means for lifting and carrying the carrying case 10.

The first tubular member 18, the wall 34, cylindrical collar 24 and the removable plug 28 define a fishing rod carrying compartment 52. The length of the first tubular member 18 may be varied depending on the length of the fishing rods or fishing rod sections which are intended to be carried by the carrying case 10. Suitable cushions or pads 54 are secured at the opposite ends of the compartment 52 adjacent the removable plug 28 and the wall 34. Such cushions may be fabricated of foam rubber or suitable synthetic foam such as Styrofoam. The cushions 54 are provided to protect the opposite ends of the fishing rods or fishing rod sections contained in the compartment 52.

The second tubular member 36, the coupling member 32, the wall 34, cylindrical collar 42, and the removable plug 46 define a fishing reel carrying compartment 56. Cushions or pads 58 and 60 are secured in the opposite ends of the compartment 56 adjacent the wall 34 and the plug 46, respectively. The cushions 58 and 60 may be suitably fabricated of foam rubber or a synthetic foam such as Styrofoam. The cushions 58 and 60 provide protection for the fishing reels which are carried in the compartment 56.

The length of the second tubular member 36 and the resultant length of the fishing reel carring compartment 56 may vary according to the number of fishing reels the compartment 56 is intended to carry.

Referring to FIG. 1, it may be seen that a plurality of fishing rods or fishing rod sections 62 may be carried in the fishing rod carrying compartment 52. It may also be seen that a plurality of fishing reels 64 may be carried in the fishing reel carrying compartment 56. It may be desirable, as shown in FIG. 1, to place the fishing reels 64 in suitable protective reel cases or bags to keep the reels 64 from scratching or otherwise causing damage to one another while in the compartment 56.

It has been found that in a preferred embodiment, the carrying case 10 will be sized such that the fishing rod carrying compartment 52 can carry at least four fishing rods therein, while the fishing reel carrying compartment 56 can carry at least four fishing reels therein. Such fishing rods may be of one-piece design or may be conventional jointed rods comprising a plurality of sections. It will be readily apparaent that other sizes for the carrying case 10 may be suitable for various applications.

It is believed apparent that the various embodiments of the present invention readily obtain the objectives set forth herein. Changes may be made in the arrangement or combination of parts or elements shown in the drawing and described in the specification without departing from the spirit and scope of the invention as defined in the following claims.

What is claimed is:

1. A carrying case for carrying fishing rods and reels comprising:
   an elongated body which includes:
      a first tubular member having first and second end portions and a longitudinal passageway extending therethrough and intersecting the first and second end portions thereof;
      a second tubular member having first and second end portions and a longitudinal passageway extending therethrough and intersecting the opposite end portions thereof;
      coupling means interconnecting the second end portion of said first tubular member and the first end portion of said second tubular member so that the respective longitudinal axes of said first and second tubular members are substantially coaxially aligned;
      partition means disposed between the second end portion of said first tubular member and the first end portion of said second tubular member for separating the respective longitudinal passageways in said first and second tubular members;
      first closure means removably securable to the first end portion of said first tubular member for alternately opening and closing the longitudinal passageway therein; and
      second closure means removably securable to the second end portion of said second tubular member for alternately opening and closing the longitudinal passageway therein.

2. The carrying case as defined in claim 1 characterized further to include:
   handle means secured to said elongated body for lifting the carrying case.

3. The carrying case as defined in claim 2 wherein the respective longitudinal passageways extending through said first and second tubular members are substantially cylindrically shaped.

4. The carrying case as defined in claim 3 wherein:
   said first closure means is threadedly securable to the first end portion of said first tubular member; and
   said second closure means is threadedly securable to the second end portion of said second tubular member.

5. The carrying case as defined in claim 4 characterized further to include:

cushion means carried within said first and second longitudinal passageways for protecting the contents thereof.

6. The carrying case as defined in claim 5 wherein the diameter of the cylindrically shaped longitudinal passageway extending through said second tubular member is substantially greater than the diameter of the substantially cylindrically shaped longitudinal passageway extending through said first tubular member.

* * * * *

PO-1050
(5/69)

UNITED STATES PATENT OFFICE
CERTIFICATE OF CORRECTION

Patent No. 3,772,819　　　　　　Dated November 20, 1973

Inventor(s) Waldo O. Ratzlaff

It is certified that error appears in the above-identified patent and that said Letters Patent are hereby corrected as shown below:

In Column 1, line 61, "potion" should be --portion--.

In Column 2, lines 37 and 38, "enlongated" should be --elongated--.

In Column 2, line 61, "cememnt" should be --cement--.

In Column 3, line 12, after the word "inside" insert --diameter--.

In Column 4, line 10, "apparaent" should be --apparent--.

Signed and sealed this 9th day of April 1974.

(SEAL)
Attest:

EDWARD M. FLETCHER, JR.
Attesting Officer

C. MARSHALL DANN
Commissioner of Patents